United States Patent
Kirkpatrick

(10) Patent No.: US 10,221,974 B2
(45) Date of Patent: Mar. 5, 2019

(54) PIPE/FITTING WITH MODIFIED CRIMP ALLOWING FOR BOTH PIPE AND FLEXIBLE DUCT INSTALLATION

(71) Applicant: FAMOUS INDUSTRIES, INC., Mount Vernon, OH (US)

(72) Inventor: Steven E. Kirkpatrick, Thurston, OH (US)

(73) Assignee: FAMOUS INDUSTRIES, INC., Mount Vernon, OH (US)

( * ) Notice: Subject to any disclaimer, the term of this patent is extended or adjusted under 35 U.S.C. 154(b) by 417 days.

(21) Appl. No.: 14/863,265

(22) Filed: Sep. 23, 2015

(65) Prior Publication Data

US 2016/0084415 A1   Mar. 24, 2016

Related U.S. Application Data

(60) Provisional application No. 62/054,163, filed on Sep. 23, 2014.

(51) Int. Cl.

| F16L 25/08 | (2006.01) |
|---|---|
| F16L 33/035 | (2006.01) |
| F16L 9/17 | (2006.01) |
| F16L 33/22 | (2006.01) |
| B21D 15/04 | (2006.01) |
| B21D 19/04 | (2006.01) |
| F24F 13/02 | (2006.01) |

(52) U.S. Cl.
CPC ............... *F16L 33/035* (2013.01); *F16L 9/17* (2013.01); *F16L 25/08* (2013.01); *B21D 15/04* (2013.01); *B21D 19/046* (2013.01); *F16L 33/22* (2013.01); *F24F 13/0209* (2013.01)

(58) Field of Classification Search
CPC .. F16L 25/0009; F16L 19/003; F24F 13/0209
USPC ......................................... 285/424, 183, 347
See application file for complete search history.

(56) References Cited

U.S. PATENT DOCUMENTS

| 2,650,114 | A | | 8/1953 | Epstein | |
|---|---|---|---|---|---|
| 4,620,729 | A | * | 11/1986 | Kauffman | F16L 41/082 285/136.1 |
| 4,930,815 | A | * | 6/1990 | Tuggler, Jr. | F16L 59/163 285/142.1 |
| 5,213,374 | A | * | 5/1993 | Keating | F16L 21/022 228/17.5 |
| 5,393,106 | A | * | 2/1995 | Schroeder | F16L 41/082 285/136.1 |
| 6,543,489 | B1 | * | 4/2003 | Luce | F16L 21/002 138/156 |

(Continued)

OTHER PUBLICATIONS

International Search Report and Written Opinion of PCT/US15/51784 dated Dec. 30, 2015.

*Primary Examiner* — Aaron M Dunwoody
(74) *Attorney, Agent, or Firm* — Matthew P. Frederick; Reed Smith LLP

(57) ABSTRACT

A pipe/fitting having an end having a modified crimp for securing both flexible ducts and pipes. Specifically, the pipe/fitting includes an end having a series of annularly disposed pipes. The modified crimp includes an outwardly facing channel in the base of the series of crimps configured to secure a flexible duct between the channel and a fastener received in the channel. The end also includes a pipe coupling system at the base of the series of crimps configured to couple a pipe to the conduit.

11 Claims, 13 Drawing Sheets

(56) References Cited

U.S. PATENT DOCUMENTS

| | | | |
|---|---|---|---|
| 7,018,127 B2 * | 3/2006 | Walsh | F16L 23/14 |
| | | | 285/424 |
| 7,393,021 B1 | 7/2008 | Lukjan | |
| 2014/0070527 A1 | 3/2014 | Bauderdick et al. | |

* cited by examiner

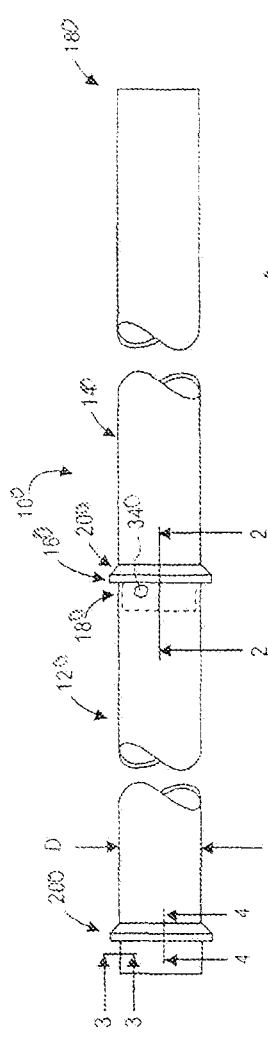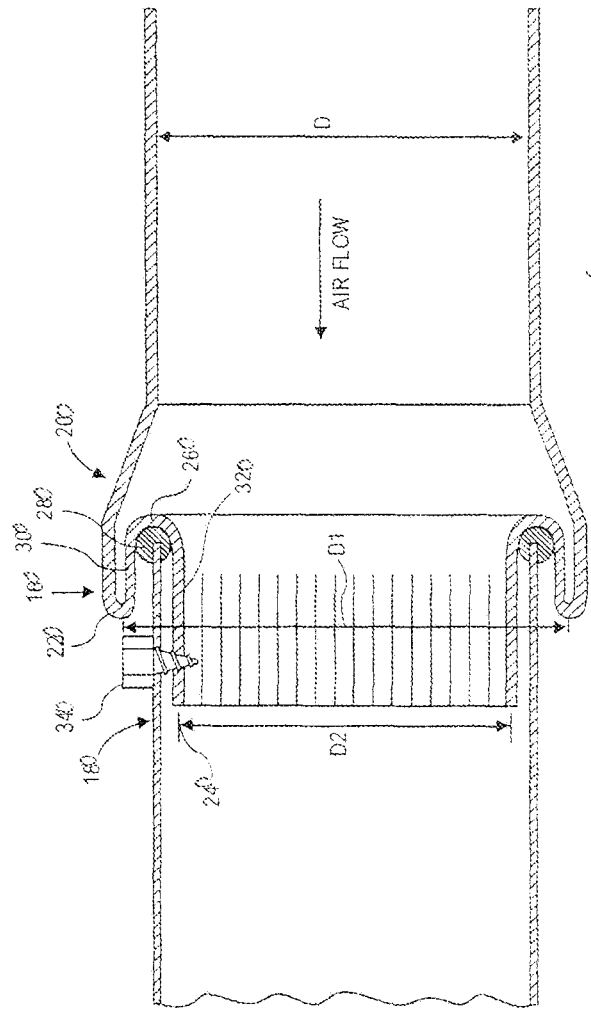

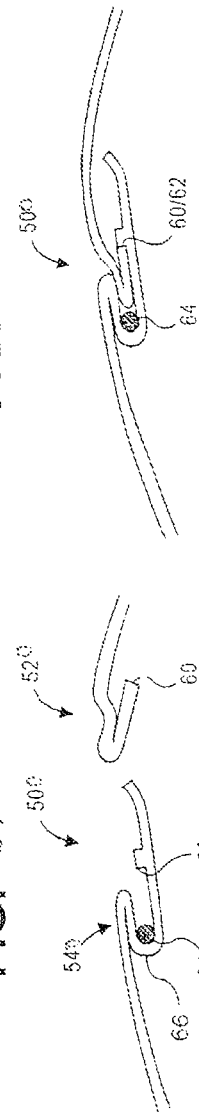

PIPE/FITTING WITH MODIFIED CRIMP ALLOWING FOR BOTH PIPE AND FLEXIBLE DUCT INSTALLATION

CROSS-REFERENCE TO RELATED APPLICATION

This application claims the benefit of the earlier filing date of, U.S. Provisional Patent Application No. 62/054,163, filed on Sep. 23, 2014, the entire contents of which are incorporated herein by reference.

FIELD OF INVENTION

This application is generally directed to the field of pipe and duct connections.

BACKGROUND

Products used in heating/ventilation/air conditioning (HVAC) units are typically formed of sheet stock such as sheet metal. Examples of metals include steel, aluminum and the like. In particular, pipe or duct work for HVAC units is typically made from one or more sections of sheet stock that are formed to create a conduit. In general, duct work or conduit may have a round and/or rectangular cross section. The sections of steel conduit are joined to create the duct work. Flexible ducts (also known as flex) are typically made of flexible plastic over a metal wire coil to shape a tube. They have a variety of configurations. Flexible duct is very convenient for attaching supply air outlets to the rigid duct work or duct work fittings. A fitting is a sheet metal piece used to connect two pieces of ductwork and/or other fittings. Typically, flexible duct is secured to rigid duct work or fittings using zip ties.

SUMMARY OF THE INVENTION

Embodiments of the invention include a conduit having a first end; and a second end opposite the first end; wherein the first end has an inverted channel, the inverted channel has a size large enough to accommodate a zip tie and a portion of a flexible duct secured between the channel and the zip tie. Embodiments of the invention further provide a series of crimps disposed annularly about the first end, the crimps comprising the inverted channel formed in the series of crimps. Any of the preceding embodiments may include a pipe coupling system configured to couple a pipe to the conduit. Any of the preceding embodiments may also include a pipe coupling system at the base of the series of crimps configured to couple a pipe to the conduit.

Any of the preceding embodiments may include a pipe coupling system including a first flange having an inwardly facing face, a second flange having an outwardly facing face, a groove disposed between the inwardly facing face of the first flange and the outwardly facing face of the second flange and a sealant disposed in the groove for receiving the pipe. The pipe coupling system of any of the preceding embodiments may also include an outwardly facing bead. The pipe coupling system of any of the preceding embodiments may also include a channel formed in a base portion of the series of crimps. In the pipe coupling system of any of the preceding embodiments, the channel may also be formed in a central portion of the series of crimps.

In any of the preceding embodiments, the conduit may be a fitting or a pipe and the channel may be 5/16 inch to 5/8 inch wide and 1/16 inch to 1/2 inch deep and accommodate a zip tie having a width of 3/8 inch to 1/2 inch.

Any of the preceding embodiments may further comprise a conduit system including a conduit having a first end; and a second end opposite the first end; wherein the first end comprises an inverted channel, the inverted channel has a size large enough to accommodate a zip tie and a portion of a flexible duct secured between the channel and the zip tie; a flexible duct located outside of the conduit and located at least partially over the channel; and a zip tie located outside of the flexible duct and located over the channel, wherein the zip tie is tightened, securing the flexible duct to the channel.

Any of the preceding embodiments may further comprise a conduit system including a conduit including a first end; and a second end opposite the first end; wherein the first end includes a series of crimps disposed annularly about the first end, the crimps comprising an inverted channel formed in the series of crimps, the inverted channel comprising a size large enough to accommodate a zip tie and a portion of a flexible duct secured between the channel and the zip tie; a pipe coupling system at the base of the series of crimps configured to couple a pipe to the conduit, the pipe coupling system comprising a first flange having an inwardly facing face, a second flange having an outwardly facing face, a groove disposed between the inwardly facing face of the first flange and the outwardly facing face of the second flange and a sealant disposed in the groove for receiving the pipe.

Any of the preceding embodiments may further comprise a method of making a conduit having a first end, and a second end opposite the first end, wherein the first end comprises a series of crimps disposed annularly about the first end, and an outwardly facing channel in the base of the series of crimps configured to secure a flexible duct between the channel and a fastener received in the channel, the method including forming sheet metal between a first roller and a second roller; wherein the first roller comprises a first tapered crimp gear and a first cylindrical crimp gear; and the second roller comprises a second tapered crimp gear and a second cylindrical crimp gear and a smooth roller.

BRIEF DESCRIPTION OF THE DRAWINGS

Various embodiments of the invention are described herein by way of example in conjunction with the following figures, wherein like reference characters designate the same or similar elements.

FIG. 5 is a schematic view of a portion of a duct system having a pipe/fitting according to embodiments of the invention.

FIG. 6 is a cross-sectional view taken along line 2-2 of FIG. 5.

FIG. 10A is a cross-sectional view taken along line 6-6 of FIG. 9 in accordance with an embodiment of the invention.

FIG. 10B is a cross-sectional view taken along line 6-6 of FIG. 9 in a locked configuration in accordance with the embodiment of FIG. 6A.

FIG. 11A is a cross-sectional view taken along line 6-6 of FIG. 9 in accordance with another embodiment of the invention.

FIG. 11B is a cross-sectional view taken along line 6-6 of FIG. 9 in a locked configuration in accordance with the embodiment of FIG. 11A.

FIG. 12 is a cross-sectional view taken along line 4-4 of FIG. 5 in a locked configuration in accordance with another embodiment of the invention.

DETAILED DESCRIPTION

Figure 2C:
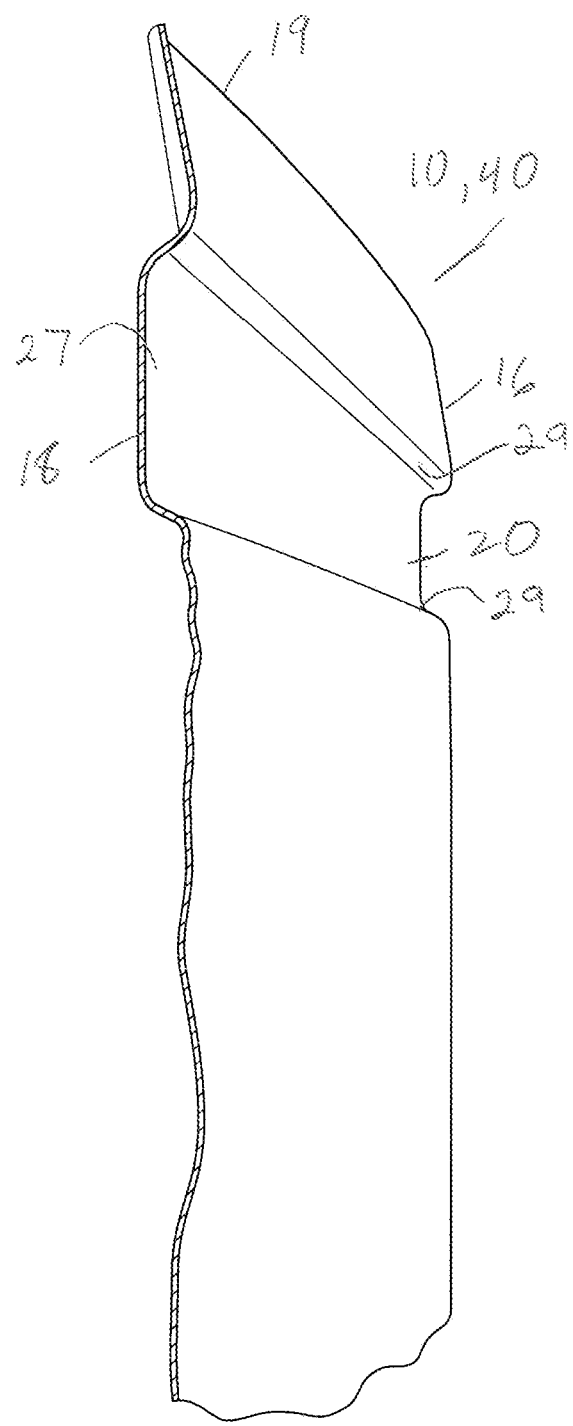
FIG. 2C is a close-up cross-section view of an end of a pipe/fitting having an inverted bead or channel according to an embodiment of the invention.
Figure 3:
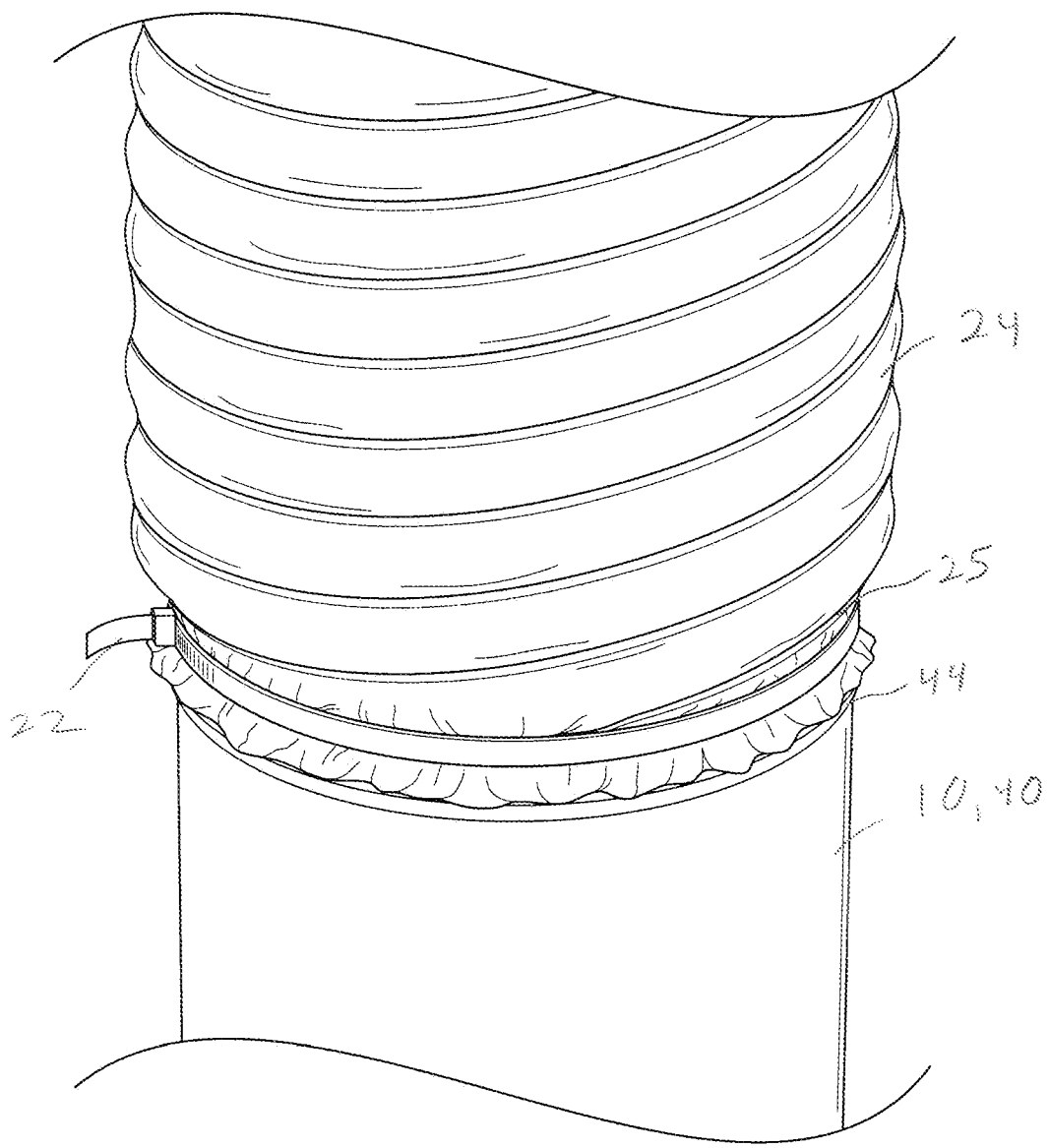
FIG. 3 is a side view of a pipe/fitting according to an embodiment of the invention attached to a flexible duct.

Embodiments of the invention include a fitting 10 or pipe 40 with an inverted bead 18 forming an inverted channel 20 at one end. As shown in FIG. 2C, the bead is inverted because it projects inwardly towards the interior of fitting 10 or pipe 40. As shown in FIG. 3, a flexible duct 24 is secured to the end of the fitting 10 or pipe 40 by first sliding the flexible duct 24 over the fitting 10 or pipe 40. Flexible duct 24 or flex duct is typically made of a flexible plastic or sheath material covering a wire coil 25 to form the shape of a tube. However, any other flexible duct may be used with certain embodiments of the invention, herein. Next, a fastener such as a nylon duct strap, cable tie, tie-wrap, hose tie or zip tie 22 is wrapped around the outside of the flexible duct 24, located over the channel 20 on the fitting 10 or pipe 40 which is located on the other side of the flexible duct 24 from the fastener. Finally, the zip tie 22, for example, is tightened around the flexible duct 24. As the zip tie 22 is tightened, it causes the zip tie 22 and a portion of the flexible duct 24 to deflect into the channel 20. In certain embodiments, portions of the helical wire 25 of the flexible duct 24 are bent by the zip tie 22 into a shape corresponding generally with the shape of the channel 20 as shown generally in FIG. 3. In further embodiments, the material of the flexible duct 24, which may include portions of the helical wire 25 and/or the sheath material, gets pinched into the channel 20 by the zip tie. It is believed that the zip tie 22 not only exerts pressure in an inward direction against the base 27 of the channel 20, but through the pinching action also exerts pressure against the side walls 29 of the channel 20. One of the benefits of these various embodiments is that the combination of the inverted bead 18 and zip tie 22 creates a mechanical lock, either by deflection of the helical wire in the flexible 24 duct, the pinching action, or a combination of both. This mechanical lock creates an unexpectedly tight lock between the flexible duct 24 and the fitting 10 or pipe 40. Channel 20 serves as a retainer for a fastener. As used herein, the term "zip tie" may refer to any such fastener. Channel 20 has a size which may depend on the size of the zip tie 22. The size of channel 20 is large enough to accommodate the zip tie 22 and a portion of the flexible duct 24 secured between channel 20 and the zip tie 22. Channel 20 is preferably ⁵⁄₁₆ to ⅝ inches and more preferably ⁷⁄₁₆ to ½ inches wide and preferably ¹⁄₁₆ to ½ inches and more preferably ⅛ to ¼ inches deep for securing a zip tie 22 which is typically ⅜ to ½ inch or smaller wide.

Embodiments of the invention may be used alone, i.e. on the end of a fitting 10 or pipe 40 containing only the inverted bead 18 as shown in FIG. 2C, or in combination with other features on the end of a fitting 10 or pipe 40. For example, in certain embodiments, embodiments of the invention may be combined on the end of a fitting 10 or pipe 40 with a taper 19 as shown in FIG. 2C. This taper 19 may make it easier to locate the flexible duct 24 over the fitting 10 or pipe 40.

In other embodiments, the invention may be included on the end of a fitting 10 or pipe 40 in combination with a feature that locates the flexible duct 24 on the fitting 10 or pipe 40. This feature may provide a stop, such as flange 44 in FIG. 2A that prevents the flexible duct 24 from sliding too far down fitting 10 or pipe 40. The end of the flexible duct 24 abuts the stop. The inverted bead 18 is at a known distance from the stop, making it easier for the installer to locate the inverted bead 18 when the flexible duct 24 is covering the channel 20 of inverted bead 18.

Figure 2A:
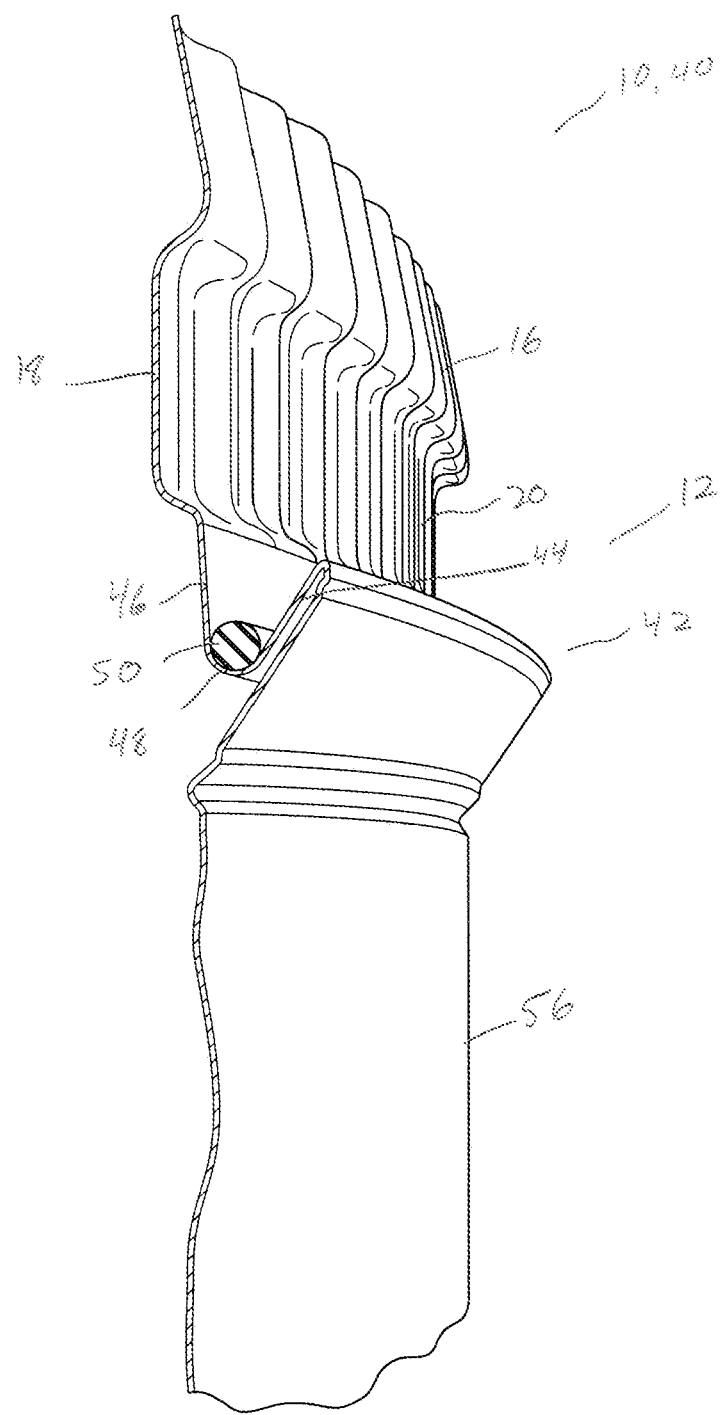
FIG. 2A is a close-up cross-section view of an end of a pipe/fitting having a modified crimp and a pipe coupling system according to an embodiment of the invention.
Figure 2B:
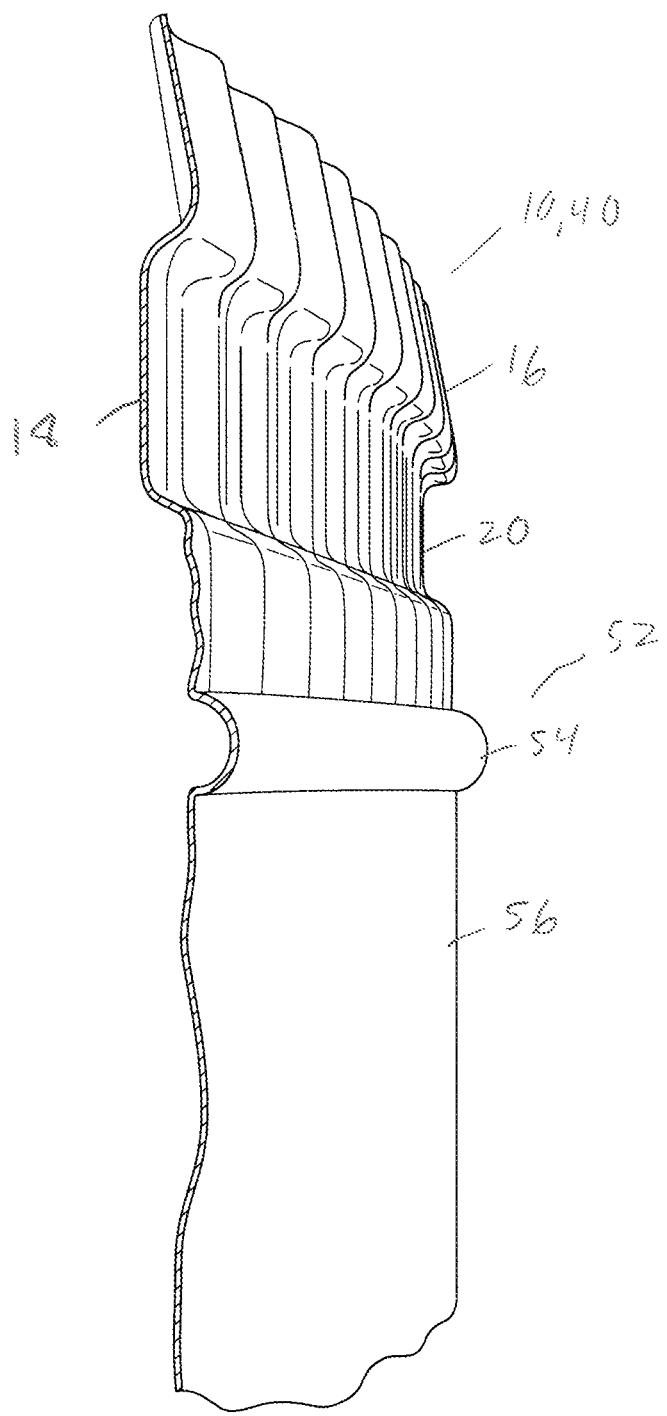
FIG. 2B is a close-up cross-section view of an end of a pipe/fitting having a modified crimp and a pipe coupling system according to an embodiment of the invention.

In certain embodiments, the invention may be included on the end of a fitting 10 or pipe 40 in combination with a locking or sealing mechanism for combining the pipe or duct with another fitting 10 or pipe 40, for example, such as pipe coupling system 42 in FIG. 2A or bead 54 in FIG. 2B. The benefits of combining embodiments of the present invention with a pipe locking or sealing mechanism are that the same fitting 10 or pipe 40 can be joined to another fitting 10 or pipe 40, or may be joined with a flexible duct 24. This flexibility allows the installer to carry one fitting 10 or pipe 40 on a job that can be used for either purpose, reducing the amount of inventory needed on the job.

Figure 1:
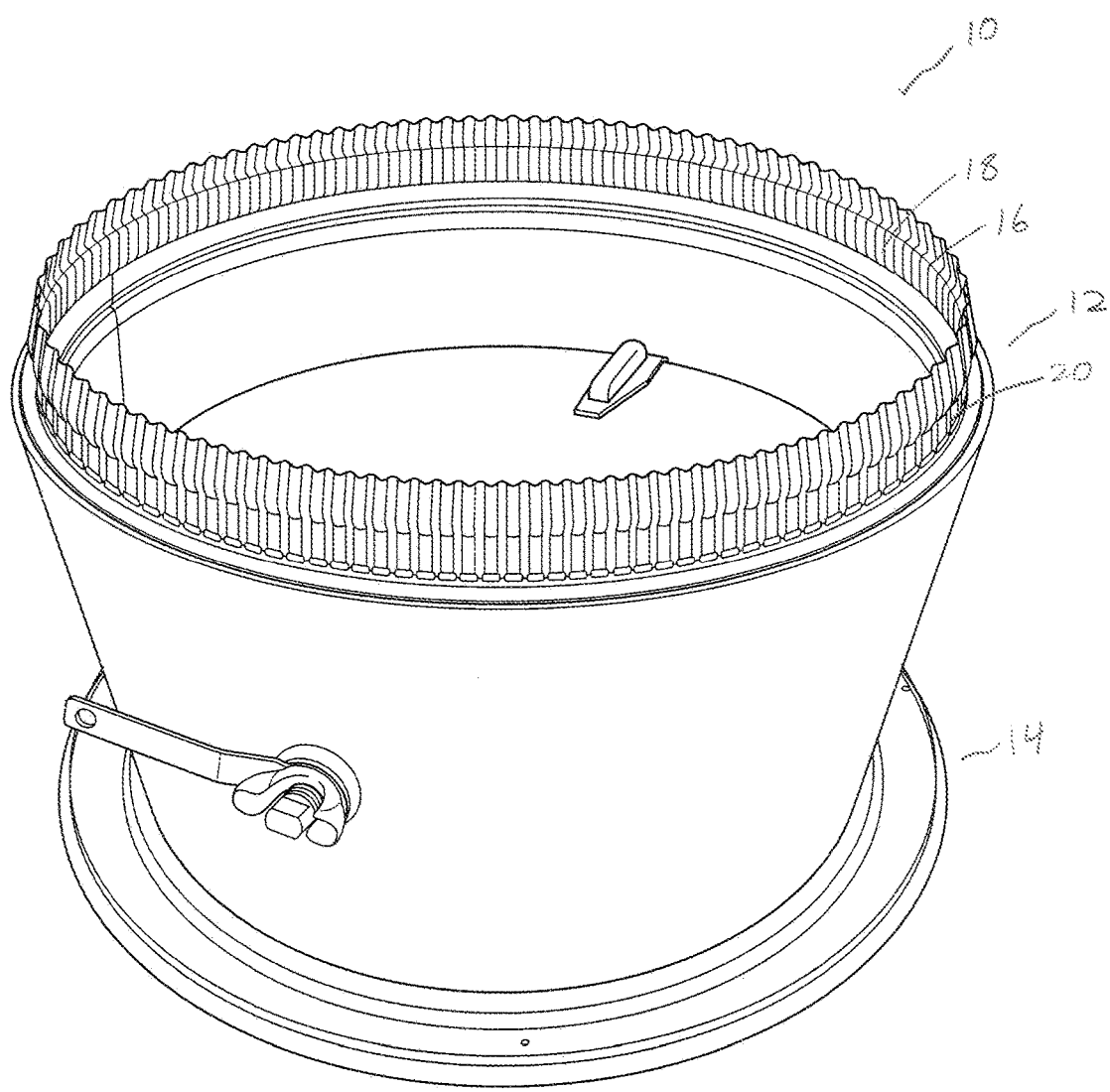
FIG. 1 is a perspective view of a fitting according to an embodiment of the invention showing an inverted bead around the crimp end of the fitting.

A round sheet metal fitting 10 according to embodiments of the invention is illustrated in FIG. 1. Fitting 10 includes a first end 12 and a second end 14 opposite the first end. First end 12 is a tapered male end including a modified crimp 16 having an inverted bead 18 to allow flexible duct installation in addition to pipe installation. Bead 18 is considered to be inverted because it projects inwardly towards the interior of fitting 10. Modified crimp 16 includes a series of crimps disposed annularly about first end 12. Bead 18 is formed from indented crimps forming an inverted, outwardly facing, flex channel 20 at the base of modified crimp 16. Channel 20 serves as a retainer for a fastener such as a nylon duct strap, cable tie, tie-wrap, hose tie or zip tie 22 that is installed around a flexible duct 24 to hold it in place on the fitting. As used herein, the term "zip tie" may refer to any such fastener. Channel 20 formed by inverted bead 18 has a size which may depend on the size of the zip tie 22. The size of channel 20 is large enough to accommodate the zip tie 22 and a portion of the flexible duct 24 secured between channel 20 and the zip tie 22. Channel 20 is preferably ⁵⁄₁₆ to ⅝ inches and more preferably ⁷⁄₁₆ to ½ inches wide and preferably ¹⁄₁₆ to ½ inches and more preferably ⅛ to ¼ inches deep for securing a zip tie 22 which is typically ⅜ to ½ inch or smaller wide. While the modified crimp 16 having an inverted bead 18 is shown on a fitting 10 in FIG. 1, the modified crimp 16 according to embodiments of the invention may also be installed on a pipe 40 in the same manner. The fitting 10 may have with one or multiple ends, such as an elbow (one end) or tees or wyes (multiple ends). As used herein, "conduit" includes both fittings and pipes.

As shown in FIG. 2A, one embodiment of the modified crimp 16 is installed on a fitting 10 or pipe 40 having a pipe coupling system 42 for attaching pipes. The benefits to having secure attachments for both a flexible duct and a pipe include that one fitting/pipe can do the job of two separate fittings/pipes, less inventory is needed at job site, and it does not take any extra material to form this additional feature on the existing coupling system 42. The pipe coupling system 42 is at the base of the modified crimp below the modified crimp 16 and above a smooth portion 56 of fitting 10 or pipe 40. Pipe coupling system 42 includes a first flange 44 having an inwardly facing face, a second flange 46 having an outwardly facing face, a groove 48 disposed between the inwardly facing face of first flange 44 and the outwardly facing face of second flange 46 and a sealant 50 disposed in groove 48 for receiving a plain end of a pipe. Pipe coupling system 42 is described in U.S. application Ser. No. 14/020,611 filed Sep. 6, 2013 and entitled Sealed Transverse Locking Pipe and Fitting, the disclosure of which is incorporated by reference herein. The pipe coupling system 42 itself is further described with reference to FIGS. 5-16, which are shown without embodiments of the inverted bead or channel. However, any of the embodiments described herein may be included on any embodiment of the pipe coupling system described herein.

As shown in FIG. 5, a pipe and fitting coupling system 100 includes a first pipe 120, a second pipe 140, and a joint 160. In addition to the straight pipes shown, the pipe and fitting coupling system 100 may include any suitable pipe and/or fitting known to those skilled in the art. Examples of suitable pipes and fittings include round and rectangular pipes, small and large radius elbow joints, 'Y' joints, 'T' joints, registers, and the like. Thus, for the sake of brevity, the term, "pipe 120" and "pipe 140" are used throughout the present disclosure and the figures depict a round pipe.

To continue, the first pipe 120 has a pipe diameter D and a plain end 180. The second pipe has a receiving end 200. The receiving end is a single piece of shaped sheet metal. In general, the metal may include any suitable metal. Examples of suitable metals include steel, aluminum, alloys, and the like. In addition, the pipes 120 and/or 140 and receiving end 200 may be made of any other suitable material. Examples of suitable materials include malleable, injectable, and/or moldable materials such as, for example, plastics and other polymers, resins, and the like.

As shown in FIG. 6, the receiving end 200 includes a first axial flange 220, a second axial flange 240, an axial groove 260, and a sealant 280. In general, the axial flanges 220 and 240 facilitate positioning the plain end 180 in the axial groove 260. The sealant 280 includes any suitable elastomeric, resilient, or otherwise malleable material that is capable of forming and maintaining a seal with the plain end 180. Particular examples of suitable materials include butyl rubber and the like. The first axial flange 220 has a first flange diameter D1 that is greater than the pipe diameter D. The second axial flange 240 has a second flange diameter D2 that is less than the pipe diameter D. The second axial flange 240 extends further axially than the first axial flange 220. As described herein, this axial extension of the second axial flange 240 facilitates securing the plain end 18 of the first pipe 120 in the receiving end 200 of the second pipe 140.

The axial groove 260 is disposed at the pipe diameter and between the first axial flange 220 and the second axial flange 240. To facilitate telescoping the plain end 180 into the receiving end, the first axial flange 220 has an inwardly angled face 300 to meet the axial groove 260 and the second axial flange 240 has an outwardly angled face 320 to meet the axial groove 260. These angled faces 300 and 320 simplify the task of aligning the two ends 180 and 200 and initiating the telescoping of the plain end 180 towards the axial groove 260. The sealant 280 is disposed in the axial groove 260 to seal the plain end 180 in the receiving end 200. The joint 160 is formed by the cooperative alignment of the plain end 180 being inserted into the receiving end 200 and being sealed by the sealant 280.

Also shown in FIGS. 5 and 6 is a fastener 340. As shown in FIG. 6, the fastener 340 is configured to pierce a wall of the plain end 180 and a wall of the second axial flange 240. In this manner, the plain end 180 may be secured in the receiving end 200. In general, the fastener 340 includes any suitable fastener. Examples of suitable fasteners include screws, pop-rivets, and the like. In a particular example, the fastener 340 is a self-tapping metal screw.

Figure 7:
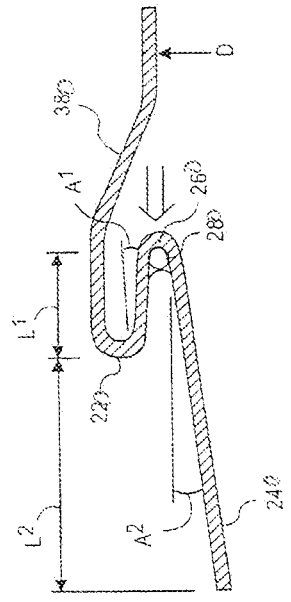
FIG. 7 is a cross-sectional view taken along line 3-3 of FIG. 5.

FIG. 7 is a cross-sectional view taken along line 3-3 of FIG. 5. As shown in FIG. 7, the second axial flange 240 includes a series of crimps 360 disposed about the circumference of the second axial flange 240. The series of crimps 360 are configured to provide a taper in the second axial flange 240. As such, the second axial flange is formed into a portion of a cone, e.g., a frusto-conical segment to facilitate telescopically sliding the plain end 180 over the second axial flange 240 and into the axial groove 260. In various embodiments of the invention, the size or width of each crimp of the series of crimps 360 is about 2 mm to about 15 mm. More particularly, each crimp is about 4 mm wide.

Figure 8:
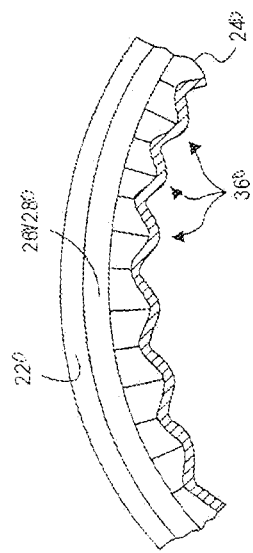
FIG. 8 is a cross-sectional view taken along line 4-4 of FIG. 5.

FIG. 8 is a cross-sectional view taken along line 4-4 of FIG. 5. As shown in FIG. 8, the inwardly angled face 300 of the first axial flange 220 includes an angle A1. In general, the angle A1 includes any suitable angle. More particularly, the angle A1 is about 1° to about 15° to facilitate telescopically sliding the plain end 180 into the axial groove 260. More particularly still, the angle A1 is about 10°. The outwardly angled face 320 of the second axial flange 240 includes an angle A2. In general, the angle A2 includes any suitable angle. More particularly, the angle A2 is about 1° to about 15° to facilitate telescopically sliding the plain end 180 into the axial groove 260. More particularly still, the angle A2 is about 5°.

Also shown in FIG. 8, the first axial flange 220 extends a length L1 past a bottom or proximal portion of the axial groove 260. The length L1 includes any suitable length. In general, the length L1 may vary from about ¼ inch (0.6 cm) to about ½ inch (1.3 cm). The second axial flange 240 extends a length L2 past a distal end of the first axial flange 220. In general, the length L2 is to provide sufficient area to secure the fastener 340. Depending upon the type of fastener utilized, the length L2 may vary from about 1 cm to about 5 cm. In a particular example, the length L2 is about 2.54 cm.

Figure 9:
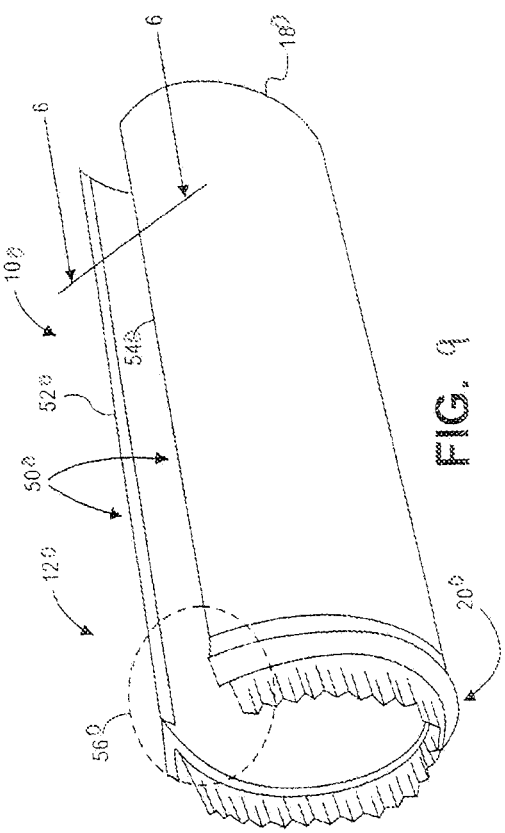
FIG. 9 is an isometric projection of a pipe of FIG. 5.

FIG. 9 is an isometric projection of the pipe 120 of FIG. 5. As shown in FIG. 9, the pipe 120 includes a longitudinal lock 500. The longitudinal lock 500 includes a male portion 520 and female portion 540. Also shown in FIG. 9 is an intersection zone 560 where the receiving end 200 (e.g., the transverse seal) intersects with the longitudinal lock 500. It is at this intersection zone 560 that the pipe and fitting coupling system 100 has the greatest tendency to leak. In order to offset this leakage tendency, additional sealant, such as the sealant 280, may be utilized as described herein.

FIG. 10A is a cross-sectional view taken along line 6-6 of FIG. 9 in accordance with an embodiment of the invention. As shown in FIG. 10A, the male portion 520 includes a hem 60 and the female portion 540 includes a locking groove 62. As shown in FIG. 10B, in response to the male portion 520 being inserted sufficiently into the female portion 540, the hem 60 slides past the locking groove 62 and engages the locking groove 62 to secure the male portion 520 in the female portion 540.

FIG. 11A is a cross-sectional view taken along line 6-6 of FIG. 9 in accordance with another embodiment of the invention. As shown in FIG. 11A, the male portion 520 includes the hem 60 and the female portion 540 includes the locking groove 62. Alternatively, the longitudinal lock 500 may include a button lock. In addition, the female portion 540 includes a sealant 64 disposed in a channel 66. As shown in FIG. 11B, in response to the male portion 520 being inserted sufficiently into the female portion 540, the male portion 520 is pressed against the sealant 64 to form a seal and the hem 60 slides past the locking groove 62 and engages the locking groove 62 to secure the male portion 520 in the female portion 540.

Figure 4:
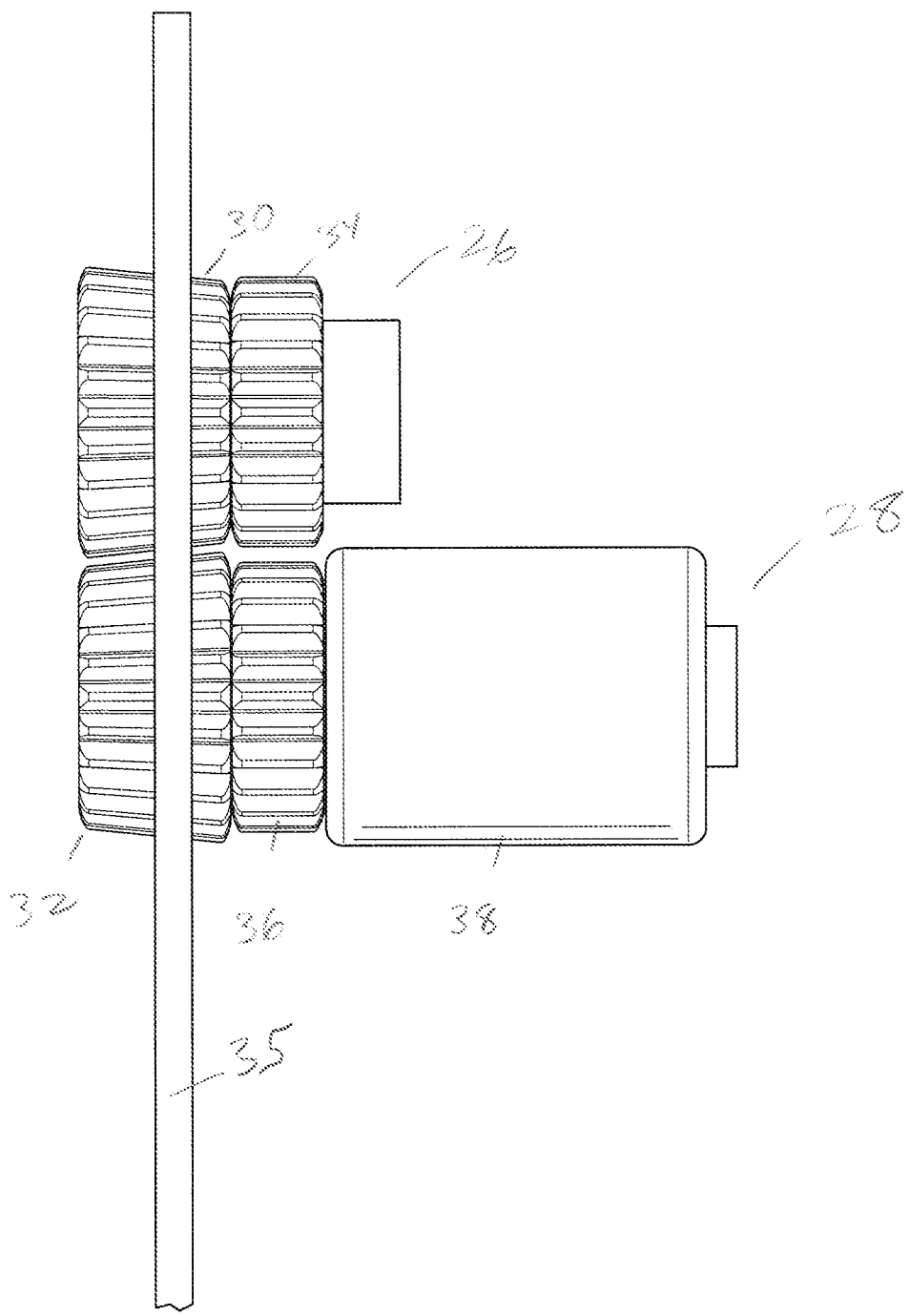
FIG. 4 is a side view of an embodiment of crimp gears used to make the modified crimp of FIG. 2.

FIG. 12 is a cross-sectional view taken along line 4-4 of FIG. 5 in a locked conformation in accordance with another embodiment of the invention. As shown in FIG. 4, the pipe and fitting coupling system 100 optionally includes a sealant 80 in a groove corresponding to the back side of the first axial flange 220. If included, the sealant 80 is configured to reduce or eliminate air leakage at the intersection zone 560. That is, by placing in the groove corresponding to the back side of the first axial flange 220, air leakage at the intersection zone 560 has been reduced based upon empirical testing.

Also shown in FIG. 12, the pipe and fitting coupling system 100 optionally includes a lock 82 disposed at the joint 160 configured to secure the plain end 180 in the receiving end 200. In general, the lock 82 includes any suitable locking structure(s) such as tabs, barbs, hems, locking grooves, buttons, dimples, hooks, catches, detents, and the like. In a particular example, the plain end 180 includes a hem 84 and the receiving end 200 includes a locking groove 86. In various examples, the hem 84 and locking groove 86 may be configured to releasably engage or substantially non-releasably engage (that is, the engagement may be sufficiently secure such that uncoupling the joint 160 results in a permanent deformation of at least the hem 84 and locking groove 86). In yet another example, the plain end 180 includes a series of the hems 84 or buttons, dimples, and the like spaced about the circumference and the receiving end includes a series of locking grooves or catches spaced about the circumference. In this manner, the lock 82 may be selectively engaged by rotating the plain end 180 relative to the receiving end 200.

Figure 14:
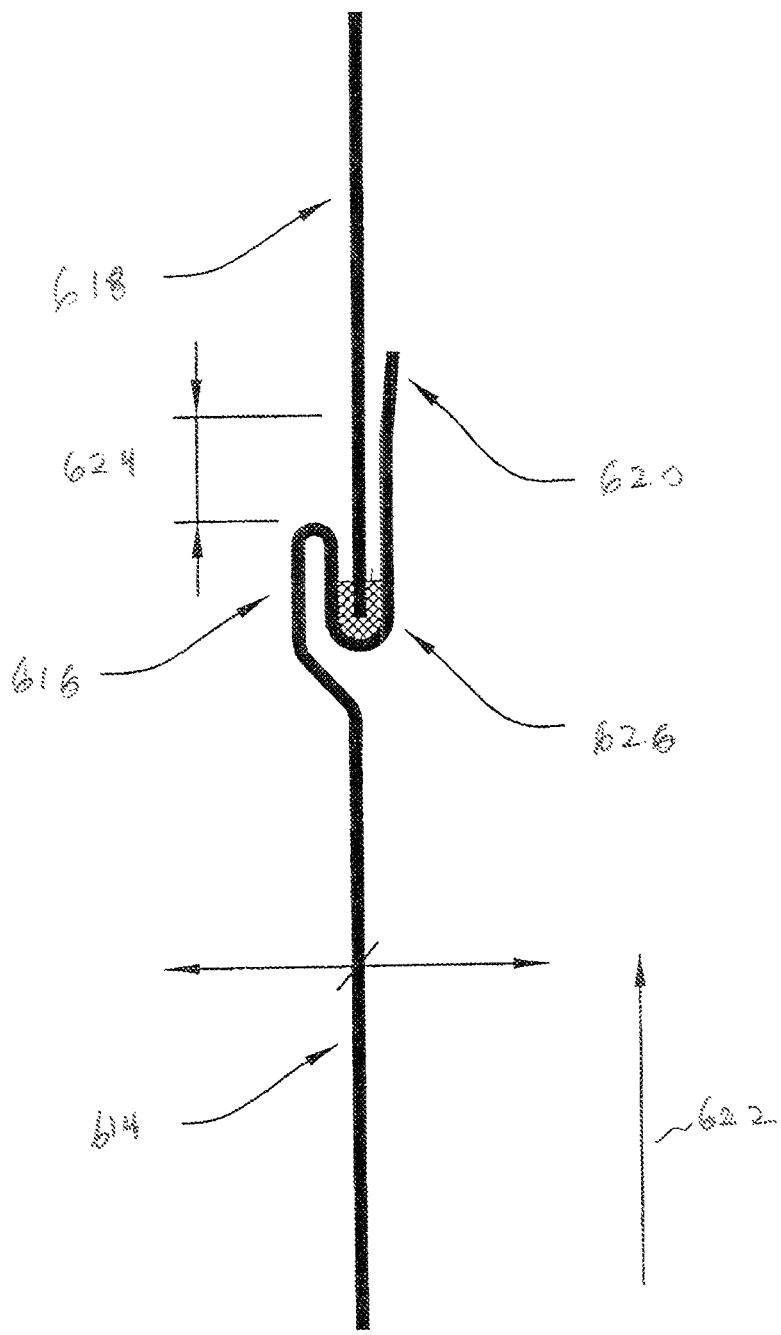
FIG. 14 is a partial cross-sectional view in accordance with an embodiment of the invention.
Figure 15:
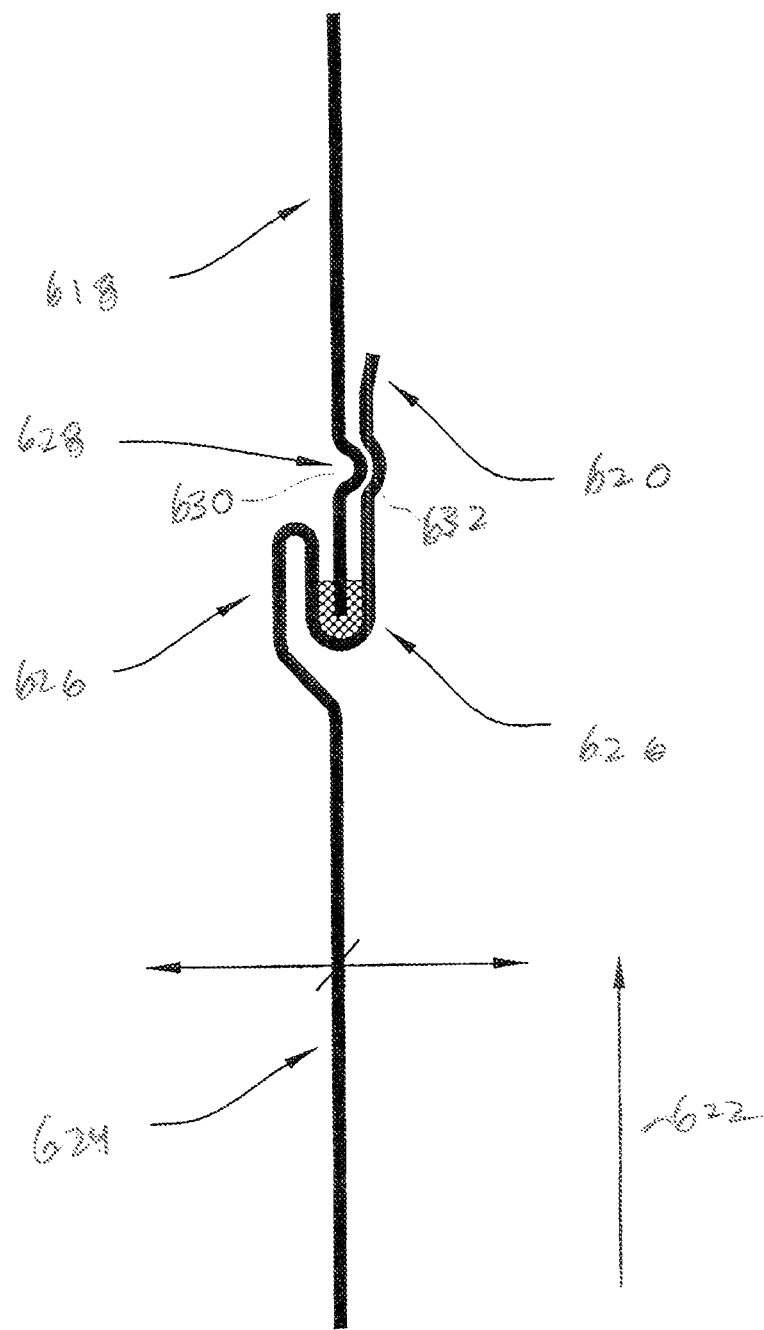
FIG. 15 is a partial cross-sectional in accordance with an embodiment of the invention including a button punch lock.
Figure 16:
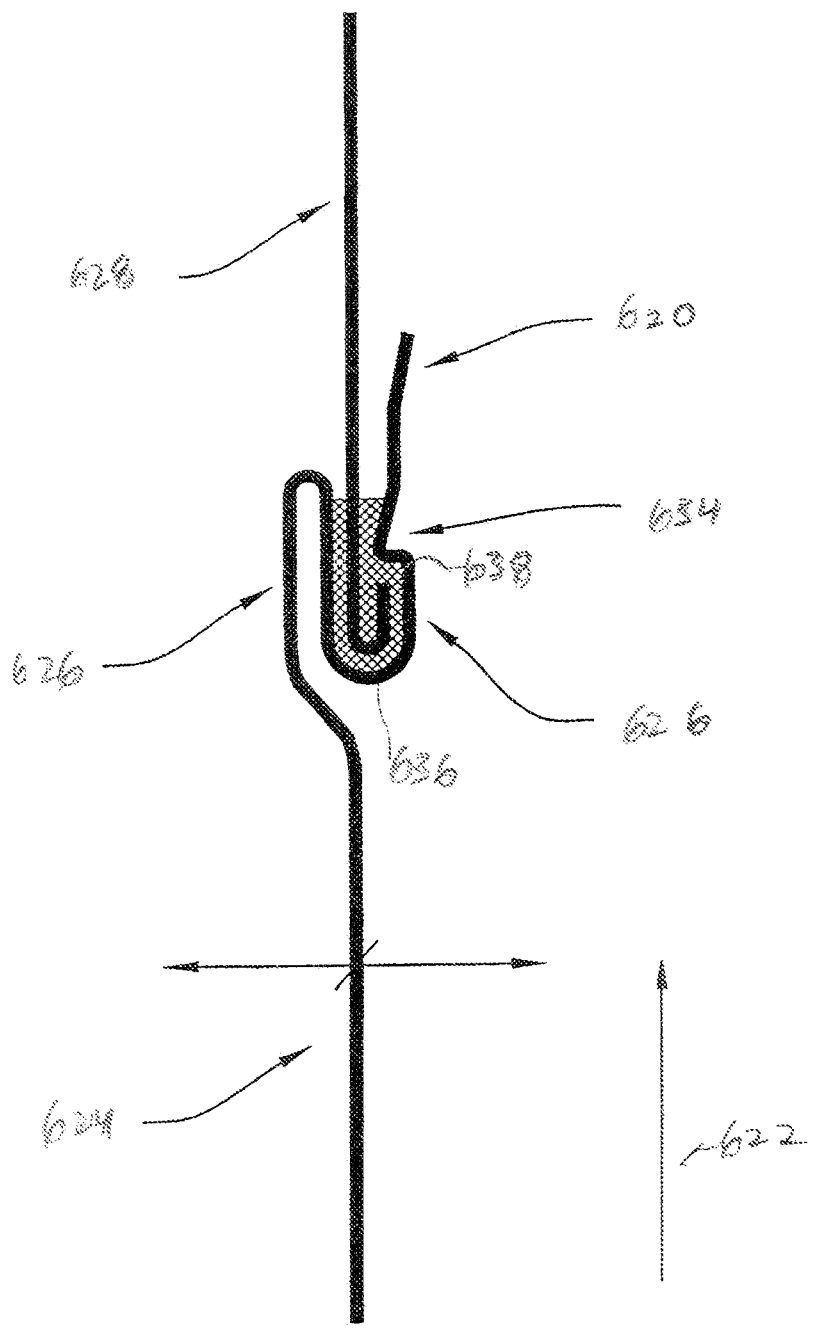
FIG. 16 is a partial cross-sectional view in accordance with an embodiment of the invention including a button snap lock.

FIGS. 14-16 show an assembled upstream pipe section 614 having a roll formed pocket 616 and a downstream pipe section 618 in accordance with embodiments of the invention. A lead-in bevel 620 may be used with or without crimping and the pipe sections may be round or rectangular. The direction of air flow is illustrated by arrow 622. In the embodiment of FIG. 14, the upstream pipe section 614 has a roll formed pocket 616 and a lead-in bevel 620. Area of screw penetration is located at area 624. Manufacturer installed sealant 626 is installed in the roll formed pocket base. FIG. 15 shows another embodiment including a self-locking button punch lock 628 including a hem 630 in the downstream pipe section 618 which locks onto a relieved portion 632 of a button on the upstream pipe section 614. FIG. 16 shows another embodiment of the invention including a button snap lock 634 including a hem 636 in the downstream pipe section 618 which locks onto a relieved portion 638 on the upstream pipe section.

Figure 13:
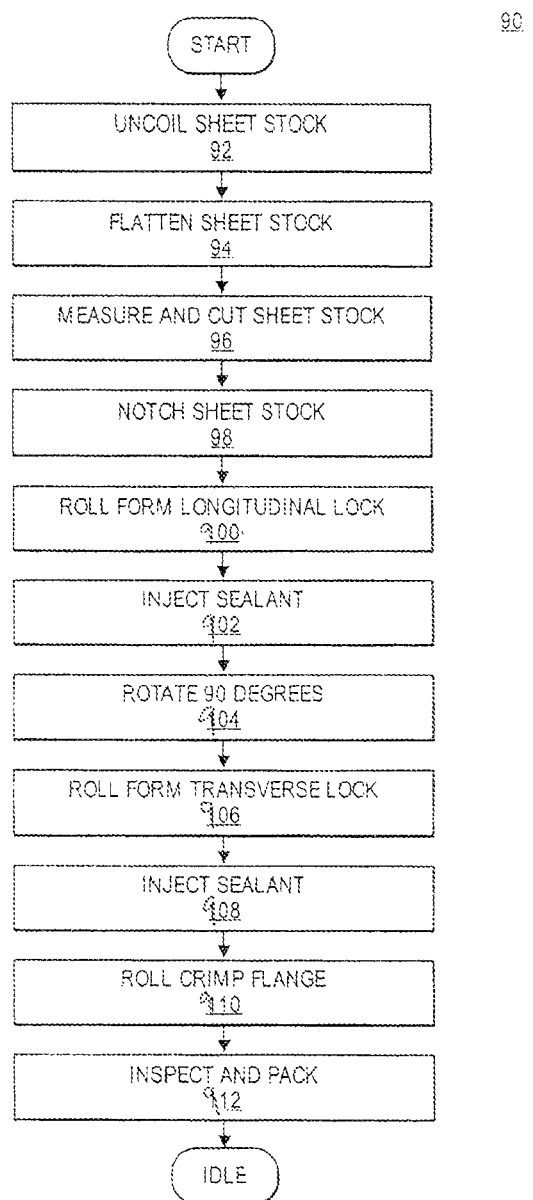
FIG. 13 is a flow diagram of a method of fabricating the pipe and fitting coupling system of FIG. 5

FIG. 13 is a flow diagram of a method 90 of fabricating the pipe and fitting coupling system of FIG. 5. In general, to fabricate a pipe such as the pipe 120 and 140, a supply of sheet metal is uncoiled with an uncoiler at step 92. The sheet metal is then flattened with a flattener to reduce the coil set, e.g., the tendency of the metal to coil at step 94. At step 96, the sheet metal is measured and cut to the predetermined dimensions by a shear, for example. A notcher removes segments of sheet metal that would otherwise interfere with the longitudinal or transverse locking mechanism at step 98. The notched sheet now travels to a conventional longitudinal lock former via a transfer table. At step 900, the sheet now receives the longitudinal lock 500 such as a "snap" lock shown in FIGS. 10A and 11A or "button" lock mechanism as shown in FIGS. 10B and 11B. One side is roll formed to a female lock, the other side to a male lock. While the locks are being formed, a sealant is injected into the female portion on the lock at step 902. Upon exiting the lock former, the pipe blank travels onto another transfer table that changes the direction of travel by 90 degrees at step 904. At step 906, the pipe blank enters the inventive roll former configured to form the receiving end 200.

In general, structures such as flanges and grooves are formed in sheet stock by passing the stock through a series of rolls or dies. A first roll in the series may initiate a bend and subsequent rolls accentuate the structure. In order to fabricate the receiving end 20, the receiving end 20 is 'flared' or otherwise formed with a die and/or rolls to generate an outwardly angled face 38. In general, the outwardly angled face 38 increases the diameter of the pipe from the diameter D to the diameter D1. Once the outwardly angled face 38 is formed, the first axial flange 22, the axial groove 26 and second axial flange 24 are formed by passing the receiving end 20 through one or a series of rolls or dies. Following step 106, the sealant 28 is injected or otherwise disposed in the axial groove 26 at step 108. The blank then travels to a crimper machine and the series of crimps 36 may be formed in the second axial flange 24 at step 110. Following fabrication, the completed pipe 12 exits onto a run-out table where it is inspected and then packaged at step 112.

Alternatively, the pipe and fitting coupling system may be fabricated via a molding or casting process. For example, as is generally known, a negative mold of the pipe 12 may be generated and a material may be introduced to the mold to form the pipe 12.

Alternatively, modified crimp 16 may be installed on fittings/pipes 10, 40 having a different pipe coupling system 52 such as that shown in FIG. 2B. In this embodiment, channel 20 is disposed in the central portion of the modified crimp. Pipe coupling system 52 does not have a groove and sealant arrangement as shown in FIG. 2A but has an annular bead 54 which prevents the pipe being coupled to fitting/pipe 10, 40 from extending beyond modified crimp portion 16 and onto the smooth portion 56 of fitting/pipe 10, 40. Channel 20 is not limited to the positions shown in FIGS. 2A and 2B but can be disposed at other positions in modified crimp portion 16. Alternatively, first end 12 may be smooth and formed without a crimp and channel 12 and be disposed at positions other than those shown in FIGS. 2A and 2B.

FIG. 3 shows a fitting/pipe 10, 40 attached to a flexible duct 24 using a zip tie 22. When securing flexible duct 24, zip tie 22 is fastened and settles into the crimped channel 20 formed by inverted bead 18 to securely fasten flexible duct 24 to fitting 10 or pipe 40. The smaller fastened diameter of zip tie 22 in channel 20 formed by inverted bead 18 prevents the connection from working itself loose over time and slipping during install. Channel 20 also provides a better sealed connection than a typical flexible duct connection.

As shown in FIG. 4, the modified crimp 16 having an inverted bead 18 is formed using first and second crimp gears/rolls 26, 28. In embodiments of the modified crimp 16 having an inverted bead is used in combination with a pipe coupling system 42 such as that shown in FIG. 2A, the step of making the modified crimp 16 having an inverted bead 18 takes place after the pipe coupling system 42 is formed. With reference to the flow diagram of FIG. 13, the step of make the modified crimp 16 having an inverted bead takes place at step 910 when the crimp is formed. Crimp gears/rolls 26, 28 engage a sheet metal tube or a piece of pipe rolling through the gears. Crimp gears/rolls 26, 28 can be used in a manual process or be integrated with standard crimp rolls on an automated pipe roller.

Crimp gears/rolls 26, 28 include two inverted tapered crimp gears 30, 32, operatively connected to cylindrical crimp gears 34, 36 and a larger smooth roll 38 on second crimp gear/roll 28 to support the inside of the sheet metal tube that this channel 20 is applied to. The edges of cylindrical crimp gears 34, 36 are preferably beveled to not damage the sheet metal. The smooth roll 38 allows the sheet metal tube to be held in position while the crimp gears are applying pressure to form channel 20. An alignment plate 35 aligns the sheet metal tube on the crimp gears/rolls 26, 28.

The invention is not limited in its application to the details of construction and to the arrangements of the components set forth in the above-description or illustrated in the drawings and that some embodiments are described by way of reference only. The invention is capable of embodiments in addition to those described and of being practiced and carried out in various ways. Also, it is to be understood that the phraseology and terminology employed herein are for the purpose of description and should not be regarded as limiting. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A conduit comprising:
    a first end, comprising a series of crimps is disposed annularly about the first end, further comprising an inverted channel is formed in the series of crimps; and a second end opposite the first end;
    wherein the inverted channel comprises a size large enough to accommodate a zip tie and a portion of a flexible duct secured between the channel and the zip tie, wherein the inverted channel is ⁵⁄₁₆ inch to ⁵⁄₈ inch wide and ¹⁄₁₆ inch to ½ inch deep and is configured to accommodate a zip tie having a width of ⅜ inch to ½ inch.

2. The conduit of claim 1 further comprising a pipe coupling system configured to couple a pipe to the conduit.

3. The conduit of claim 1 further comprising a pipe coupling system at the base of the series of crimps configured to couple a pipe to the conduit.

4. The conduit of claim 3, wherein the pipe coupling system includes a first flange having an inwardly facing face, a second flange having an outwardly facing face, a groove disposed between the inwardly facing the of the first flange and the outwardly facing face of the second flange and sealant disposed in the groove for receiving the pipe.

5. The conduit of claim 2, wherein the pipe coupling system comprises an outwardly facing bead.

6. The conduit of claim 1, wherein the channel is formed in a base portion of the series of crimps.

7. The conduit of claim 1, wherein the channel is formed in a central portion of the series of crimps.

8. The conduit of claim 1, wherein the conduit is a fitting.

9. The conduit system of claim 1, wherein the conduit is a pipe.

10. A conduit system comprising:
    a conduit comprising:
        a first end, comprising a series of crimps is disposed annularly about the first end, and further comprising an inverted channel is formed in the series of crimps; and
        a second end opposite the first end;
    a flexible duct located outside of the conduit and located at least partially over the inverted channel; and
    a zip tie located outside of the flexible duct and located over the inverted channel, wherein the zip tie is configured to be tightened, securing the flexible duct to the channel,
    wherein the inverted channel comprises a size larger enough to accommodate a zip tie and a portion of a flexible duct secured between the channel and the zip tie, wherein the inverted channel is ⁵⁄₁₆ inch to ⅝ inch wide and ¹⁄₁₆ inch to ½ inch deep and is configured to accommodate a zip tie having a width of ⅜ inch to ½ inch.

11. The conduit system of claim 10, further comprising a pipe coupling system at the base of the series of crimps configured to couple a pipe to the conduit, wherein the pipe coupling system includes a first flange having an inwardly facing face, a second flange having an outwardly facing face, a groove disposed between the inwardly facing face of the first flange and the outwardly facing face of the second flange and a sealant disposed in the groove for receiving the pipe.

* * * * *